United States Patent
Kim et al.

(10) Patent No.: US 8,358,712 B2
(45) Date of Patent: Jan. 22, 2013

(54) APPARATUS AND METHOD FOR TRANSMITTING/RECEIVING REFERENCE SIGNAL IN A COMMUNICATION SYSTEM

(75) Inventors: Tae-Young Kim, Seongnam-si (KR); Hyun-Kyu Yu, Seoul (KR); Ho-Kyu Choi, Seongnam-si (KR); Jae-Weon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1026 days.

(21) Appl. No.: 12/364,318

(22) Filed: Feb. 2, 2009

(65) Prior Publication Data

US 2009/0196367 A1    Aug. 6, 2009

(30) Foreign Application Priority Data

Feb. 1, 2008    (KR) ................. 10-2008-0010886

(51) Int. Cl.
*H04L 27/28* (2006.01)
(52) U.S. Cl. ......... 375/260; 375/130; 375/299; 375/295
(58) Field of Classification Search .................. 375/260, 375/130, 295, 299; 370/208, 252, 330, 69.1; 455/59
See application file for complete search history.

(56) References Cited

U.S. PATENT DOCUMENTS

| | | | |
|---|---|---|---|
| 5,651,090 A | | 7/1997 | Moriya et al. |
| 7,933,357 B2 * | | 4/2011 | Mazzarese et al. ........... 375/299 |
| 8,107,986 B2 * | | 1/2012 | Cho et al. ..................... 455/522 |
| 2005/0265433 A1 | | 12/2005 | Okumura et al. |
| 2006/0046789 A1 * | | 3/2006 | Huh et al. ...................... 455/571 |
| 2006/0120270 A1 * | | 6/2006 | Han et al. ....................... 370/208 |
| 2006/0153144 A1 | | 7/2006 | Kwun et al. |
| 2007/0237068 A1 * | | 10/2007 | Bi et al. ........................ 370/208 |
| 2008/0063029 A1 * | | 3/2008 | Zeira et al. .................... 375/130 |
| 2008/0227481 A1 * | | 9/2008 | Naguib et al. .............. 455/550.1 |
| 2010/0150000 A1 * | | 6/2010 | Sakata ........................... 370/252 |
| 2011/0235540 A1 * | | 9/2011 | Yu et al. ........................ 370/252 |

FOREIGN PATENT DOCUMENTS

| KR | 10-2001-0083040 A | 8/2001 |
|---|---|---|
| KR | 10-2006-0082228 A | 7/2006 |

OTHER PUBLICATIONS

Parvathy Venkatasubramanian et al., Opportunistic Configurations of Pilot Tones for PAPR Reduction in OFDM Systems, The 18th Annual IEEE International Symposium on Personal, Indoor and Mobile Radio Communications, 2007.

* cited by examiner

*Primary Examiner* — Shuwang Liu
*Assistant Examiner* — Helene Tayong
(74) *Attorney, Agent, or Firm* — Jefferson IP Law, LLP

(57) ABSTRACT

An apparatus and method for transmitting/receiving a reference signal in a communication system are provided, in which a transmitter determines first and second different transmit power values for first and second pilot tones residing in one of the substantially same time resource and the substantially same frequency resource among pilot tones included in a data area in a subframe having time and frequency resources, and transmits the first pilot tone with the first transmit power value and the second pilot tone with the second transmit power value. The first transmit power may be a reference transmit power value and the second transmit power may be a product between a weight and the reference transmit power value.

18 Claims, 10 Drawing Sheets

APPARATUS AND METHOD FOR TRANSMITTING/RECEIVING REFERENCE SIGNAL IN A COMMUNICATION SYSTEM

PRIORITY

This application claims the benefit under 35 U.S.C. §119(a) of a Korean patent application filed in the Korean Intellectual Property Office on Feb. 1, 2008 and assigned Serial No. 10-2008-0010886, the entire disclosure of which is hereby incorporated by reference.

BACKGROUND OF THE INVENTION

1. Field of the Invention

The present invention relates to an apparatus and method for transmitting/receiving a reference signal in a communication system.

2. Description of the Related Art

A DownLink (DL) frame includes a MAP message area and a data area in a communication system. The data area has data bursts and pilot tones. Each data burst is a set of data tones. The MAP message area includes MAP messages, each carrying data burst allocation information indicating the positions of the data bursts in the data area.

Accordingly, MAP message decoding should precede data burst decoding data from a DL frame at a receiver. Thus, MAP messages should be transmitted with high reliability.

To increase the transmission reliability of the MAP messages, the MAP messages are generated at a low coding rate. Each MAP message may include data burst allocation information for a plurality of individual users. However, this scheme requires a large MAP message area in the DL frame, thus reducing the data area.

To address the above problem, the MAP message area is divided into a plurality of MAP message areas and data burst allocation information carried in the MAP message areas are transmitted at different transmit power levels. Each divided MAP message area includes data burst allocation information for at least one user and the transmit power levels of the data burst allocation information can be determined, taking into account the channel environments and locations of the users.

When different transmit powers are allocated to the divided MAP message areas, different transmit powers can also be applied to data areas associated with the MAP message areas. Notably, a divided MAP message area and its associated data area have different transmit power levels.

As a consequence, a 'Power Unbalance' occurs since a plurality of data areas have different transmit powers.

The power unbalance leads to transmission of pilot tones included in the data areas at different power levels. When the pilot tones of the DL frame have the substantially same transmit power, the receiver can carry out channel estimation using the pilot tones. However, the use of different transmit powers for the pilot tones due to the power unbalance makes pilot tone-based channel estimation difficult.

Accordingly, there exists a need for a method for performing channel estimation accurately using pilot tones, in spite of power unbalance between the data bursts of different data areas or the data bursts of different subframes.

SUMMARY OF THE INVENTION

An aspect of the present invention is to address at least the above-mentioned problems and/or disadvantages and to provide at least the advantages described below. Accordingly, an aspect of the present invention is to provide a transmission/reception apparatus and method for accurately performing channel estimation using pilot tones, despite there being a power unbalance.

Another aspect of the present invention is to provide an apparatus and method for transmitting some of pilot tones included in each data area of a DL frame at a predefined reference transmit power level.

A further aspect of the present invention is to provide a transmission/reception apparatus and method for performing channel estimation based on a difference between transmit powers of pilot tones included in each data area of a DL frame.

In accordance with an aspect of the present invention, a method for transmitting a reference signal in a transmitter in a communication system is provided. The method includes the transmitter determines first and second different transmit power values for first and second pilot tones residing in one of the substantially same time resource and the substantially same frequency resource among pilot tones included in a data area in a subframe having time and frequency resources, and transmits the first pilot tone with the first transmit power value and the second pilot tone with the second transmit power value. The first transmit power comprises a reference transmit power value and the second transmit power comprises a product between a weight and the reference transmit power value.

In accordance with another aspect of the present invention, a method for receiving a reference signal in a receiver in a communication system is provided. The method includes the receiver receives first and second pilot tones residing in one of the substantially same time resource and the substantially same frequency resource among pilot tones included in a data area in a subframe having time and frequency resources, estimates a weight being a ratio between a first transmit power value of the first pilot tone and a second transmit power value of the second pilot tone, changes transmit power values of the pilot tones to a substantially equal value using the weight, and performs channel estimation using the pilot tones with the substantially equal transmit power value. The first transmit power comprises a reference transmit power value and the second transmit power comprises a product between the weight and the reference transmit power value.

In accordance with a further aspect of the present invention, an apparatus for transmitting a reference signal in a transmitter in a communication system is provided. The apparatus includes a power decider determines first and second different transmit power values for first and second pilot tones residing in one of the substantially same time resource and the substantially same frequency resource among pilot tones included in a data area in a subframe having time and frequency resources, and a Radio Frequency (RF) module transmits the first pilot tone with the first transmit power value and the second pilot tone with the second transmit power value. The first transmit power comprises a reference transmit power value and the second transmit power comprises a product between a weight and the reference transmit power value.

In accordance with still another aspect of the present invention, an apparatus for receiving a reference signal in a receiver in a communication system is provided. The apparatus includes an RF module receives first and second pilot tones residing in one of the substantially same time resource and the substantially same frequency resource among pilot tones included in a data area in a subframe having time and frequency resources, a power weight calculator estimates a weight being a ratio between a first transmit power value of the first pilot tone and a second transmit power value of the second pilot tone, and a channel estimator changes transmit power values of the pilot tones to a substantially equal value using the weight and performs channel estimation using the pilot tones with the substantially equal transmit power value. The first transmit power comprises a reference transmit power value and the second transmit power comprises a product between the weight and the reference transmit power value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
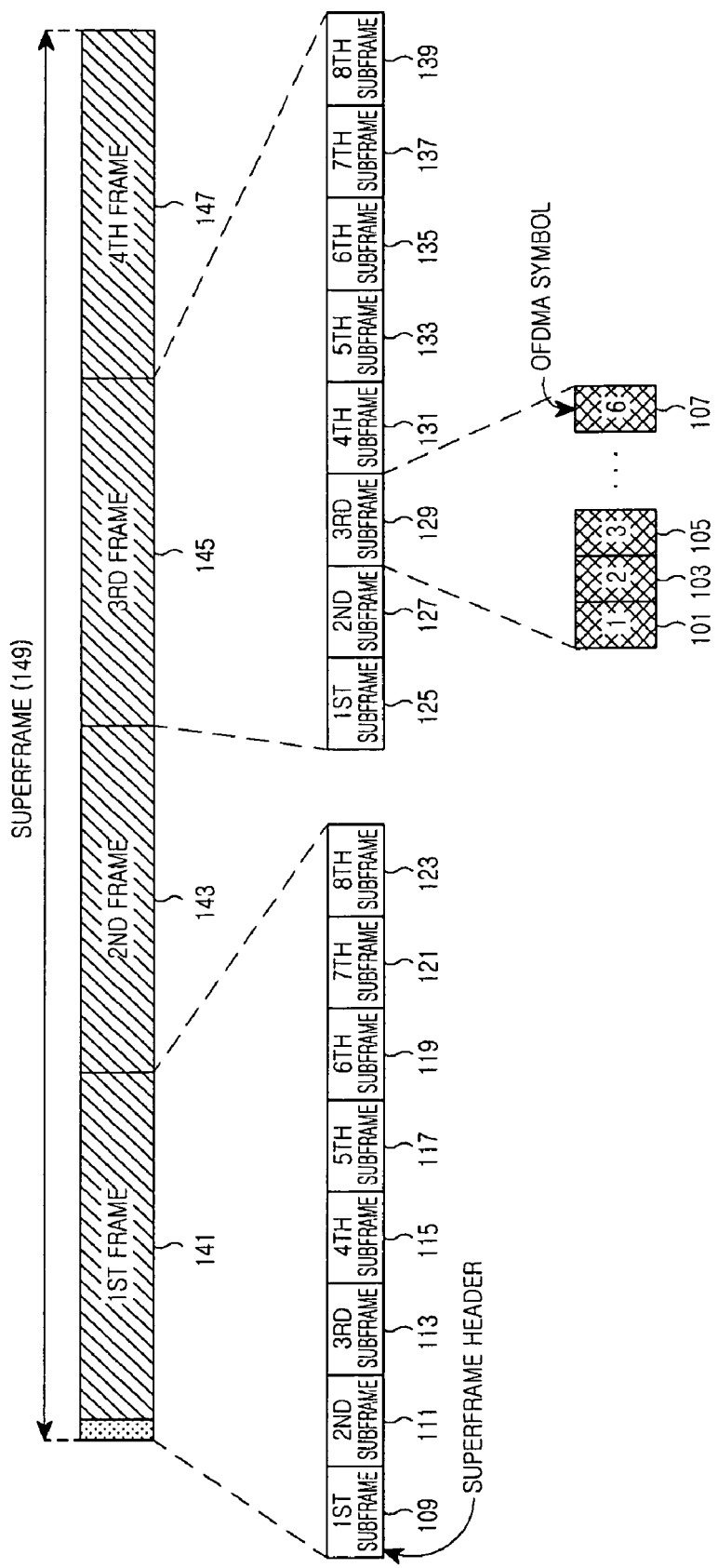
FIG. 1 illustrates a frame structure according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Due to a power unbalance between data areas, different data areas have different transmit power values for pilot tones, thereby making it difficult for a receiver to perform channel estimation using the pilot tones. To address this problem, a transmitter sets the transmit power values of some of the pilot tones in the data areas to a reference transmit power value and sets the transmit power values of the remaining pilot tones to the products between weights and the reference transmit power value. The weights are larger than zero (0) and are determined based on the transmit power values of data bursts carrying the pilot tones and the transmit power values of MAP messages. The transmitter transmits the pilot tones with the determined transmit power values.

The receiver receives a DownLink (DL) frame and estimates a weight applied to each data area by calculating the difference between the transmit power values of pilots in the data area in the DL frame. The receiver then changes the transmit power values of all pilot tones in the DL frame to the substantially same value using the estimated weights and performs channel estimation using the power value-changed pilot tones.

In the description of exemplary embodiments of the present invention, "adjacent pilot tones" refer to successive pilot tones and "neighboring pilot tones" refer to pilot tones with only one or more data tones in between.

FIG. 1 illustrates a frame structure according to an exemplary embodiment of the present invention. With reference to FIG. 1, the frame structure of an exemplary embodiment of the present invention will be described.

Referring to FIG. 1, the frame structure hierarchically has a superframe, frames, and subframes. For example, a superframe 149 is composed of four frames 141, 143, 145 and 147 and one frame 145 has eight subframes 125, 127, 129, 131, 133, 135, 137 and 139. One subframe 129 includes six Orthogonal Frequency Division Multiple Access (OFDMA) symbols 101, 103, 105, . . . , 107. The superframe may be 20 ms long and the frame may be 5 ms long.

An OFDMA symbol occupies a time-frequency area defined by a frequency band and a basic time unit.

A frame includes a superframe header with a preamble and Broadcast CHannel (BCH) information. The preamble may be used for system synchronization and may have at least one OFDMA symbol. While the superframe header resides in a first subframe 109 among subframes 109, 111, 113, 115, 117, 119, 121 and 123 of a first frame 141 in FIG. 1, it can also be positioned in any of second, third and fourth frames 143 to 147. The transmitter includes a preamble in every superframe prior to transmission and the receiver can acquire system synchronization and identify a serving Base Station (BS) by the preamble.

The BCH information includes periodically-changing control information in Downlink Channel Descriptor/Uplink Channel Descriptor (DCD/UCD) information, and the period of the BCH information can be determined as a multiple of a superframe length according to the control information carried on a BCH.

The following description will be made in the context of a Time Division Duplexing (TDD) communication system where some subframes in a frame are DL subframes and the other subframes are UpLink (UL) subframes. For example, if a frame is composed of eight subframes, first to fifth subframes can be DL subframes and sixth, seventh and eight subframes can be UL subframes.

Each DL subframe includes MAP areas and data areas. The MAP areas have MAP messages carrying data burst allocation information and the data areas include data bursts.

Figure 2:
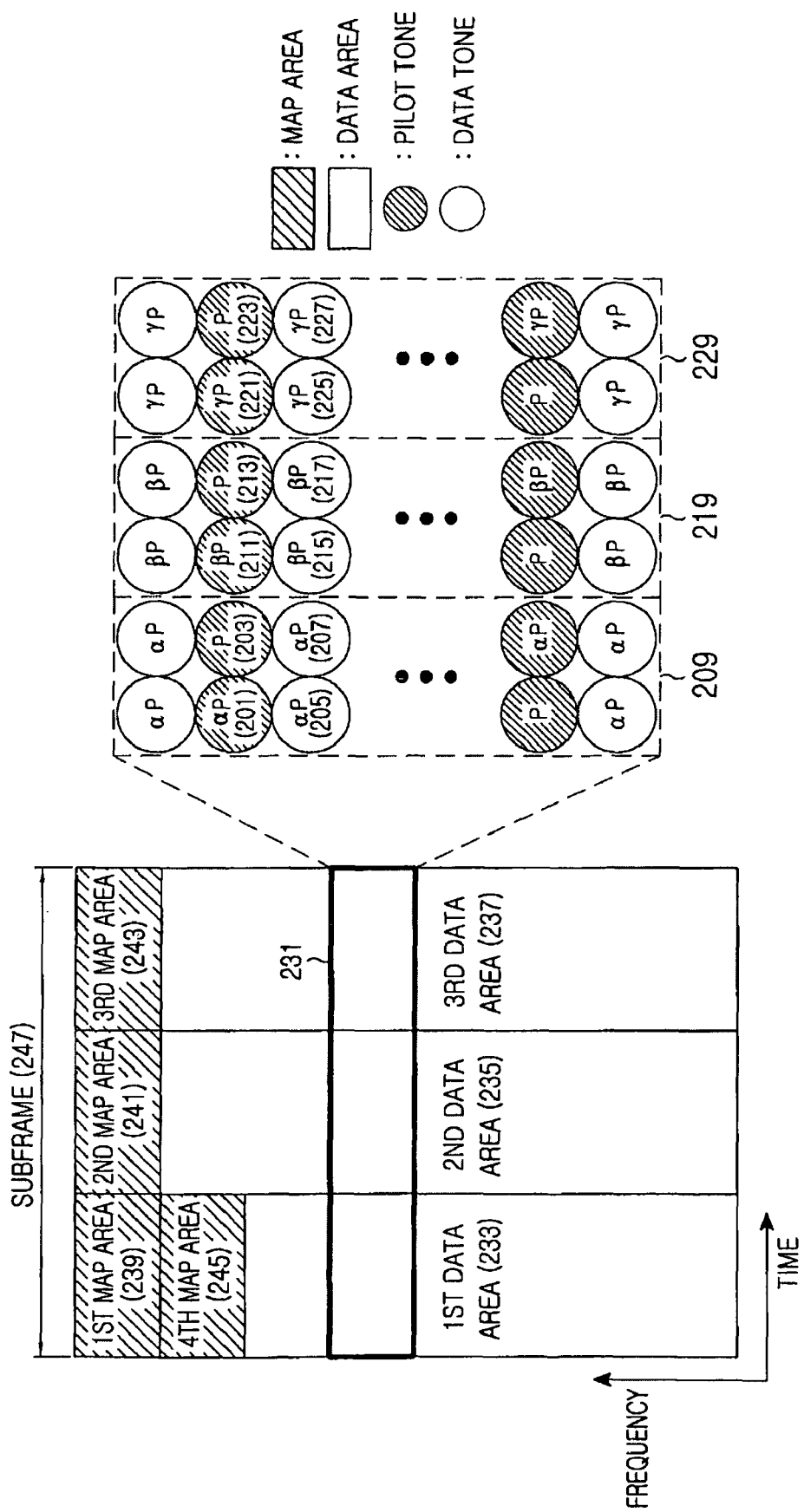
FIG. 2 illustrates a structure of a DL subframe according to a first exemplary embodiment of the present invention.

FIG. 2 illustrates a structure of a DL subframe according to a first exemplary embodiment of the present invention. With reference to FIG. 2, the DL subframe structure will be described.

Before describing FIG. 2, a MAP message transmission method will first be described. The manner in which MAP messages are transmitted depends on a multiplexing method for multiplexing data bursts with MAP messages intended for respective users and a coding scheme used for the MAP messages.

For multiplexing the data bursts with the MAP messages, Time Division Multiplexing (TDM) and Frequency Division Multiplexing (FDM) are available. The data bursts and the MAP messages are multiplexed in time in TDM, whereas they are multiplexed in frequency in FDM.

Separate coding or joint coding is used for encoding the MAP messages for respective users depending on whether the MAP messages are separated from an overall MAP message on a user basis, for encoding. More specifically, a plurality of MAP messages for respective users are generated from the overall MAP message and encoded individually in the separate coding scheme. In the joint coding scheme, the overall MAP message is encoded. When the communication system uses the separate coding scheme, transmit power values are determined for the individual MAP messages according to the locations and channel environments of the users and the MAP messages are transmitted with the determined transmit power values. If the users are substantially similar in location and channel environment, the substantially same transmit power value can be applied to the MAP messages.

In the description of exemplary embodiments of the present invention, it is assumed that MAP messages are transmitted in an FDM/separate coding scheme.

Referring to FIG. 2, a DL subframe 247 includes four MAP messages for four users in first to fourth MAP areas 239, 241, 243 and 245, and data bursts for the four users in first, second and third data areas 233, 235 and 237. An area 231 covers part of the data areas 233, 235 and 237. The area 231 is divided into areas 209, 219 and 229. The area 209 has a plurality of pilot tones 201 and 203 and a plurality of data tones 205 and 207. The area 219 has a plurality of pilot tones 211 and 213 and a plurality of data tones 215 and 217. The area 229 has a plurality of pilot tones 221 and 223 and a plurality of data tones 225 and 227.

In the exemplary embodiment of the present invention, the first and fourth MAP messages are transmitted with the substantially same transmit power value, while the first, second and third MAP messages have different transmit power values. The transmit power values of the MAP messages are determined according to the channel environments and locations of users to receive the MAP messages.

To be more specific, when the users to receive the first and fourth MAP messages are a substantially similar location under a substantially similar channel environment, the substantially same transmit power value is determined for the first and fourth MAP messages. If the users to receive the first, second and third MAP messages are at different locations under different channel environments, different transmit power values are determined for the first, second and third MAP messages. Since the MAP messages are transmitted with the determined transmit power values, their reception reliability increases.

That is, in the case where the four MAP messages are included in the first to fourth MAP areas 239, 241, 243 and 245 in a one-to-one correspondence, the first MAP message in the first MAP area 239 and the fourth MAP message in the fourth MAP area 245 are transmitted with the substantially same transmit power value. The first and fourth MAP messages, the second MAP message of the second MAP area 241, and the third MAP message of the third MAP area 243 have different transmit power values.

As the transmit power values are determined for the MAP messages according to the channel environments and locations of the individual users and the MAP messages are transmitted with the determined transmit power values, the data areas are transmitted with different transmit power values in every time unit. Consequently, the data areas are placed in a power unbalance. More specifically, an entire data area is divided into the first, second and third data areas 233, 235 and 237 according to the classification of the overall MAP message for the users and data bursts are transmitted with different transmit power values in the first, second and third data areas 233, 235 and 237.

The power imbalance between the data areas makes it impossible for the receiver to perform channel estimation using pilot tones. In this context, an exemplary embodiment of the present invention is to provide a method for performing channel estimation using pilot tones in a receiver, despite there being a power unbalance between data areas.

To enable the receiver to carry out channel estimation using pilot tones, despite there being the power unbalance between the data areas 233, 235 and 237, different transmit power values are allocated to adjacent pilot tones in the data areas 233, 235 and 237, taking into account the transmit power values of the data areas 233, 235 and 237, prior to transmission.

In other words, in an exemplary embodiment of the present invention, one of the adjacent pilot tones is transmitted with a reference transmit power value and the other pilot tone is transmitted with a transmit power value being a product between a weight and the reference transmit power value in each data area. The weight of a pilot tone is larger than zero (0), depending on the transmit power value of a data area carrying the pilot tone.

For example, if the data tones 205 and 207 are transmitted with a transmit power value, $\alpha P$ in the first data area 233, the data tones 215 and 217 are transmitted with a transmit power value, $\beta P$ in the second data area 235, and the data tones 225 and 227 are transmitted with a transmit power value, $\gamma P$ in the third data area 237, the transmitter transmits one 201 of the temporally adjacent pilot tones 201 and 203 with the data tone transmit power value $\alpha P$ and the other pilot tone 203 with a reference transmit power value P in the first data area 233, transmits one 211 of the temporally adjacent pilot tones 211 and 213 with the data tone transmit power value $\beta P$ and the other pilot tone 213 with the reference transmit power value P in the second data area 235, and transmits one 221 of the temporally adjacent pilot tones 221 and 223 with the data tone transmit power value $\gamma P$ and the other pilot tone 223 with the reference transmit power value P in the third data area 237. $\alpha$, β and γ are weights larger than zero (0), each being a transmit power ratio between adjacent pilot tones. α, β and γ can be substantially equal or different. Alternatively, only one of α, β and γ can be different.

The receiver estimates the transmit power ratio between adjacent pilot tones for each data area, changes the transmit power values of all pilot tones in the data areas to a substantially equal value using the estimated transmit power ratios, and then performs channel estimation using the pilot tones. The receiver also can generate channel information about the respective data areas by applying the transmit power ratios to the estimated channel information and decode data using the channel information about the data areas.

If the transmit power values αP and P are applied to the adjacent pilot tones 201 and 203 in the first data area 233, the transmit power values βP and P are applied to the adjacent pilot tones 211 and 213 in the second data area 235, and the transmit power values γP and P are applied to the adjacent pilot tones 221 and 223 in the third data area 237, the receiver estimates the weight α by calculating the transmit power ratio between the pilot tones 201 and 203 of the first data area 233, and estimates the weights β and γ in a substantially similar manner. The receiver changes the transmit power values of all pilot tones included in the first, second and third data areas 233, 235 and 237 to the reference transmit power value P. For the power change, the receiver divides the transmit power values αP, βP and γP by α, β and γ respectively. The receiver performs channel estimation using the pilot tones with the transmit power value P and estimates channel information about the first, second and third data areas 233, 235 and 237 by applying α, β and γ to the estimated channel information, respectively.

The receiver decodes data bursts included in the first, second and third data areas 233, 235 and 237 using the channel estimation about the respective data areas 233, 235 and 237.

Figure 3:
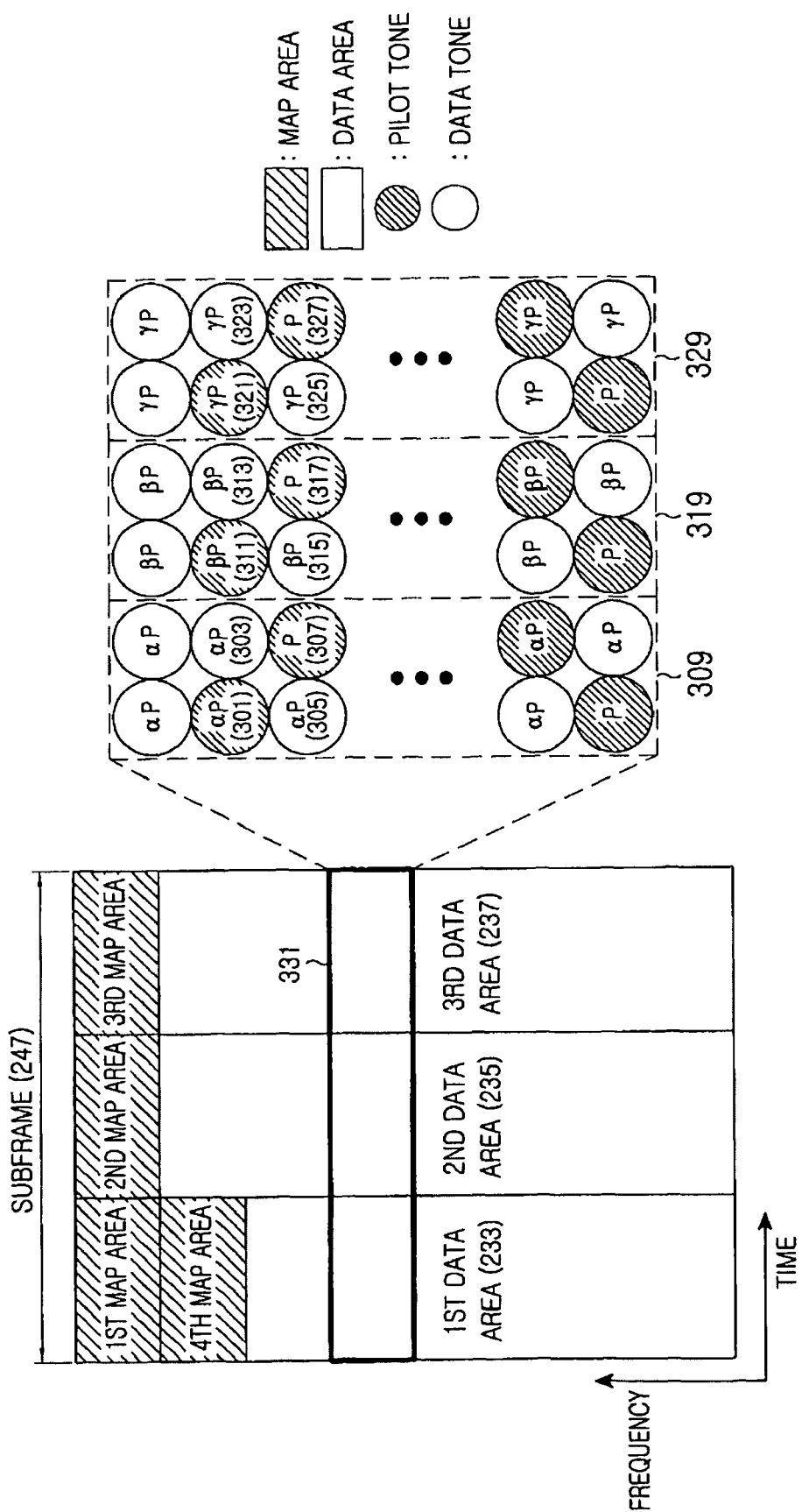
FIG. 3 illustrates a structure of a DL subframe according to a second exemplary embodiment of the present invention.

FIG. 3 illustrates a structure of a DL subframe according to a second exemplary embodiment of the present invention.

Referring to FIG. 3, an area 331 covers part of the first, second and third data areas 233, 235 and 237 of DL subframe 247. The area 331 is divided into areas 309, 319 and 329. The area 309 includes a plurality of pilot tones 301 and 307 and a plurality of data tones 303 and 305, the area 319 includes a plurality of pilot tones 311 and 317 and a plurality of data tones 313 and 315, and the area 329 includes a plurality of pilot tones 321 and 327 and a plurality of data tones 323 and 325.

The DL subframe 247 structures illustrated in FIGS. 2 and 3 are substantially similar in that the transmitter sets the transmit power value of one of adjacent pilot tones to a reference transmit power value and the transmit power value of the other pilot tone to a product between the reference transmit power value and a weight in each data area. FIGS. 2 and 3 differ in that adjacent pilot tones are adjacent in time in FIG. 2, whereas they are adjacent in frequency in FIG. 3. In the case where pilot tones adjacent to each other in time or in frequency are in substantially similar channel environments as illustrated in FIGS. 2 and 3, different transmit power values can be applied to the adjacent pilot tones.

Figure 4:
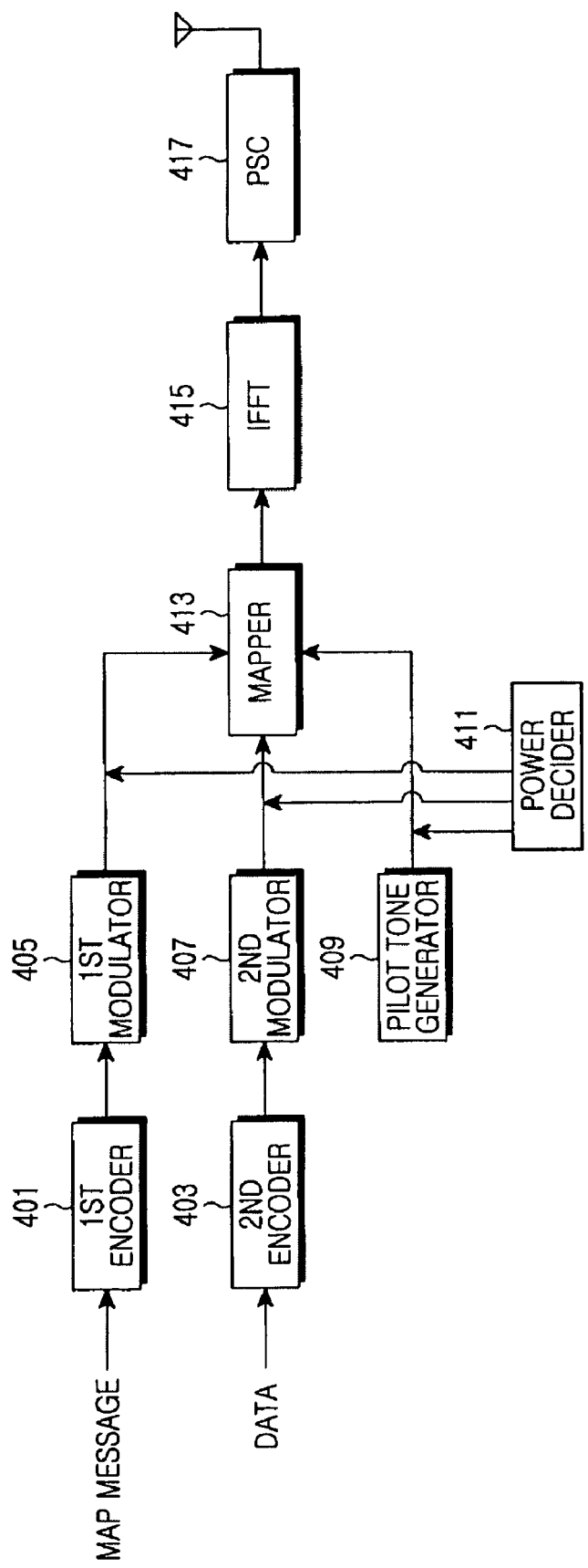
FIG. 4 is a block diagram of a transmitter according to the first exemplary embodiment of the present invention.

FIG. 4 is a block diagram of a transmitter according to the first exemplary embodiment of the present invention.

Referring to FIG. 4, the transmitter includes first and second encoders 401 and 403, first and second modulators 405 and 407, a pilot tone generator 409, a power decider 411, a mapper 413, an Inverse Fast Fourier Transform (IFFT) processor 415, a Parallel-to-Serial Converter (PSC) 417, and a Radio Frequency (RF) module (not shown).

The first encoder 401 receives a MAP message, generates MAP messages for individual users from the received MAP message, and encodes the MAP messages in a predefined coding scheme. The second encoder 403 receives data bursts and encodes the data bursts in a predefined coding scheme. The first modulator 405 modulates the encoded MAP messages in a predefined modulation scheme. The second modulator 407 generates data tones by modulating the encoded data bursts in a predefined modulation scheme. The pilot tone generator 409 generates pilot tones for a DL subframe.

The power decider 411 determines transmit power values for the respective MAP messages, taking into account Channel Quality Information (CQI) about a total frequency band and determines transmit power values for data areas according to the transmit power values of the MAP messages. For determining the transmit power values of the data areas, the power decider 411 computes Equation (1) and the transmit power value of each data area depends on the relationship between the transmit power value of a particular MAP area and the total transmit power value of the MAP area and the data area.

$$\alpha P = \frac{N - N_p - \sum_{i}^{u} N_i \delta_{MAP_i}}{N - N_p - \sum_{i}^{u} N_i} \cdot P \qquad (1)$$

In Equation (1), αP denotes a transmit power value for data tones in the data area, N denotes the total number of subcarriers in the DL subframe, P denotes the reference transmit power value, $N_p$ denotes the number of pilot subcarriers transmitted with the reference transmit power value at a predefined time, $N_i$ denotes the number of subcarriers allocated to a MAP message for an $i^{th}$ user, $\delta_{MAP_i}$ denotes a transmit power weight applied to the MAP message for the $i^{th}$ user, and u denotes the number of users to receive the MAP messages allocated to the data area.

The power decider 411 determines the transmit power values of adjacent pilot tones in each data area according to the transmit power value of the data area. To be more specific, the power decider 411 determines the transmit power value of one of the adjacent pilot tones to be that of the data area carrying the pilot tones and the transmit power value of the other pilot tone to be the reference transmit power value.

For example, if the power decider 411 determines the transmit power value αP for the data tones of the first data area 233, it can set the transmit power value of one of adjacent pilot tones included in the first data area 233 to αP and the transmit power value of the other pilot tone to P.

The power decider 411 outputs the transmit power values of the MAP messages, the transmit power values of the data tones of the data areas, and the transmit power values of adjacent pilot tones in each data area to the mapper 413.

The mapper 413 allocates the received transmit power values to the MAP messages, the data tones, and the pilot tones received from the first modulator 405, the second modulator 407, and the pilot tone generator 409, respectively and maps the data tones, pilot tones, and MAP messages.

The IFFT processor 415 IFFT-processes the mapped signal received from the mapper 413 and the PSC 417 converts parallel IFFT signals into a serial signal. The RF module (not shown) transmits the serial signal through an antenna.

Figure 5:
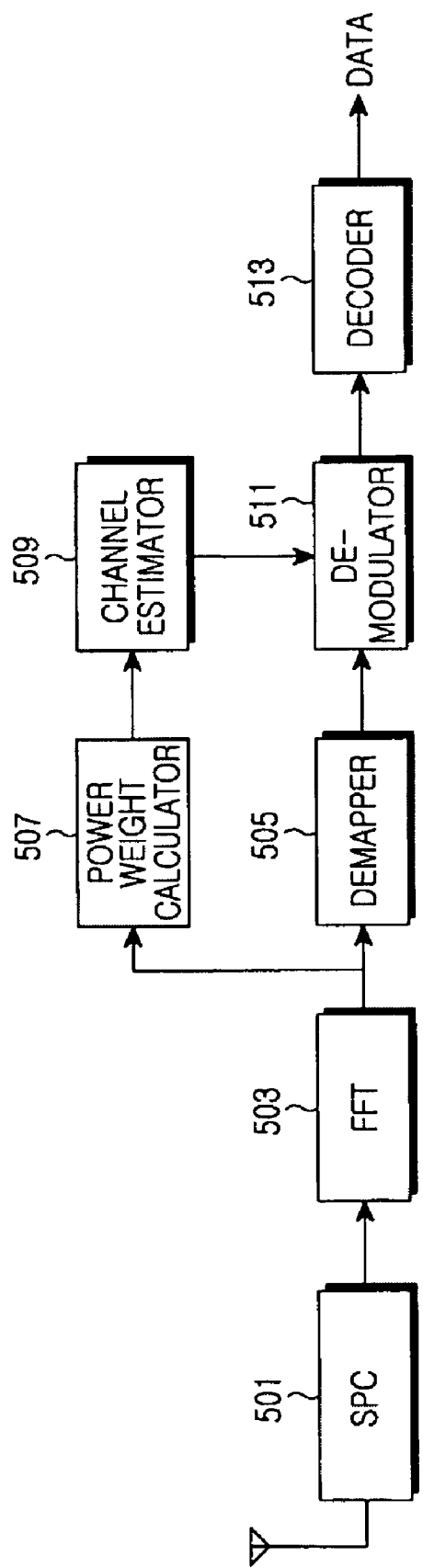
FIG. 5 is a block diagram of a receiver according to the first exemplary embodiment of the present invention.

FIG. 5 is a block diagram of a receiver according to the first exemplary embodiment of the present invention.

Referring to FIG. 5, the receiver includes a Serial-to-Parallel Converter (SPC) 501, a Fast Fourier Transform (FFT) processor 503, a demapper 505, a power weight calculator 507, a channel estimator 509, a demodulator 511, a decoder 513, and an RF module (not shown).

The RF module (not shown) receives a signal through an antenna and the SPC 501 converts the signal received from the RF module into parallel signals. The FFT processor 503 FFT-processes the parallel signals and outputs the FFT signal to the demapper 505 and the power weight calculator 507. The demapper 505 demaps the FFT signal.

The power weight calculator 507 estimates the weights of data areas by comparing the transmit power values of adjacent pilot tones in the data areas. Each weight is a transmit power ratio between adjacent pilot tones. For example, if the transmit power values of adjacent pilot tones included in the first data area 233 are $\alpha P$ and P, the power weight calculator 507 estimates $\alpha$ by calculating a transmit power ratio between the pilot tones and estimates $\beta$ and $\gamma$ in a substantially similar manner.

The channel estimator 509 changes the transmit power values of all pilot tones in the entire data areas to the substantially same value using the weights. For instance, the channel estimator 509 detects pilot tones with the transmit power value of $\alpha P$ from among the pilot tones of the first data area 233 and changes the transmit power value $\alpha P$ of the detected pilot tones to P by dividing $\alpha P$ by $\alpha$.

The channel estimator 509 performs channel estimation using the pilot tones with the substantially same transmit power value, estimates channel information about the respective data areas by applying the weights to the estimated channel information, and outputs the channel information about the data areas to the demodulator 511. For example, the channel estimator 509 estimates channel information about the first data area 233 by multiplying the weight $\alpha$ of the first data area 233 by the estimated channel information.

The demodulator 511 demodulates data tones included in the data areas using the demapped signal and the channel information about the data areas according to a predefined demodulation scheme. The decoder 513 generates data by decoding the demodulated data tones received from the demodulator 511 in a predefined decoding scheme.

Figure 6:
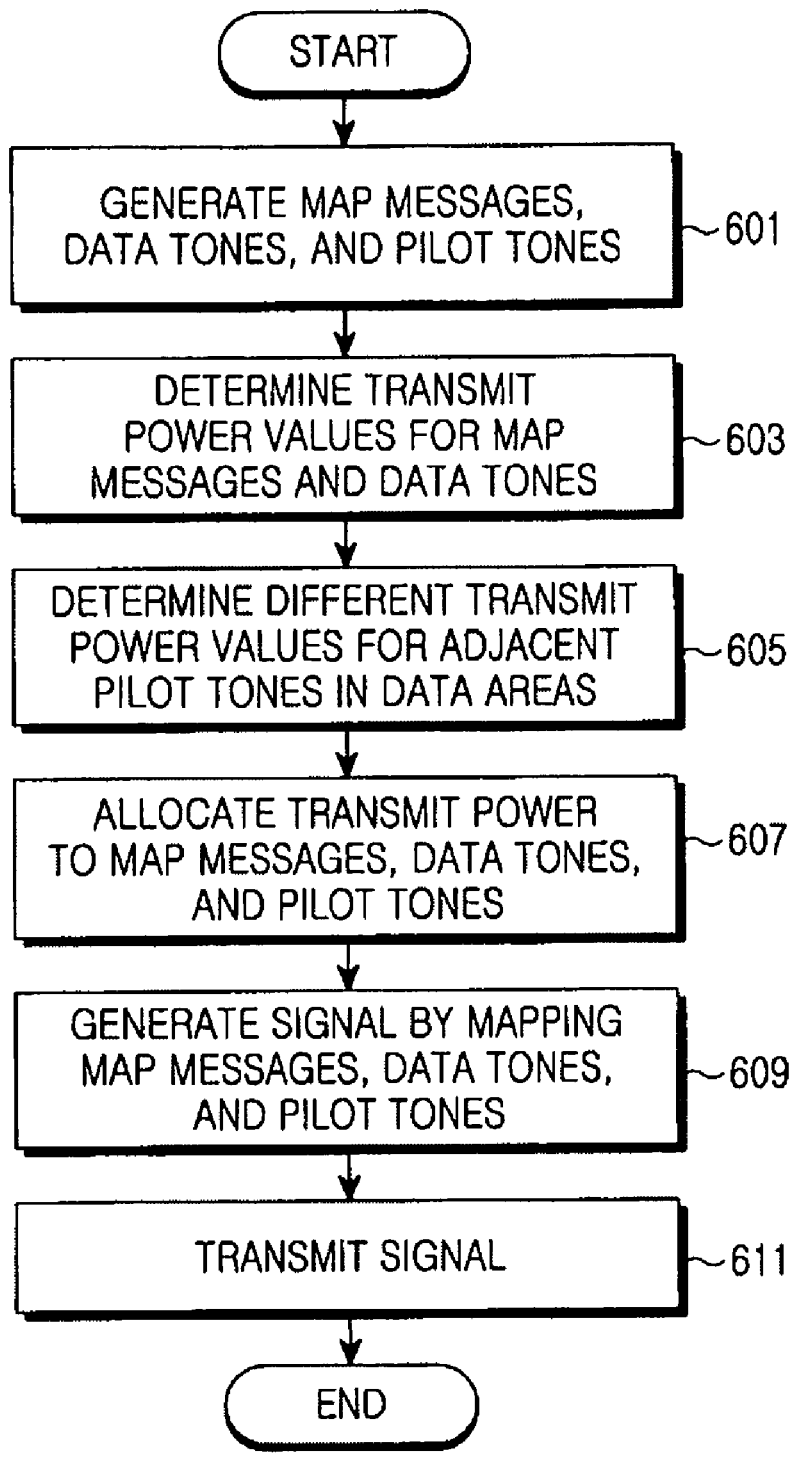
FIG. 6 is a flowchart illustrating a signal transmission operation of the transmitter according to the first exemplary embodiment of the present invention.

FIG. 6 is a flowchart illustrating a signal transmission operation of the transmitter according to the first exemplary embodiment of the present invention.

Referring to FIG. 6, the transmitter generates MAP messages for respective users, data tones, and pilot tones on a subframe basis in step 601 and determines transmit power values for the MAP messages and the data tones using CQI in step 603. More specifically, the transmitter receives feedback CQI from the receiver, determines the transmit power values of the MAP messages based on the CQI, and determines the transmit power values of data areas by using Equation (1).

In step 605, the transmitter determines weights $\alpha$, $\beta$ and $\gamma$ for the data areas, taking into account the transmit power values of the data areas. The weight of each data area is a transmit power ratio between adjacent pilot tones in the data area. For each data area, the transmitter sets the transmit power value of one of adjacent pilot tones to a reference transmit power value and the transmit power value of the other pilot tone to the product between the reference transmit power value and the weight of the data area.

For example, when the transmit power value of all data tones included in the first data area 233 is $\alpha P$, the transmitter determines $\alpha P$ as the transmit power value of a particular one of adjacent pilot tones included in the first data area 233 and P as the transmit power value of the other pilot tone. In this manner, the transmitter allocates different transmit power values to adjacent pilot tones in each data area.

In step 607, the transmitter allocates transmit power to the MAP messages and the data tones and pilot tones of the data areas according to the transmit power values determined in steps 603 and 605.

The transmitter generates a signal by mapping the MAP messages, the data tones, and the pilot tones in step 609 and transmits the signal to the receiver through the antenna after IFFT in step 611.

By using the above operation, the transmitter determines different transmit power values for adjacent pilot tones in each data area according to the transmit power values of the data area and transmits the pilot tones with the determined transmit power values. Herein, the transmit power value of one of the adjacent pilot tones is the reference transmit power value and that of the other pilot tone is the product between the reference transmit power value and the weight of the data area.

Figure 7:
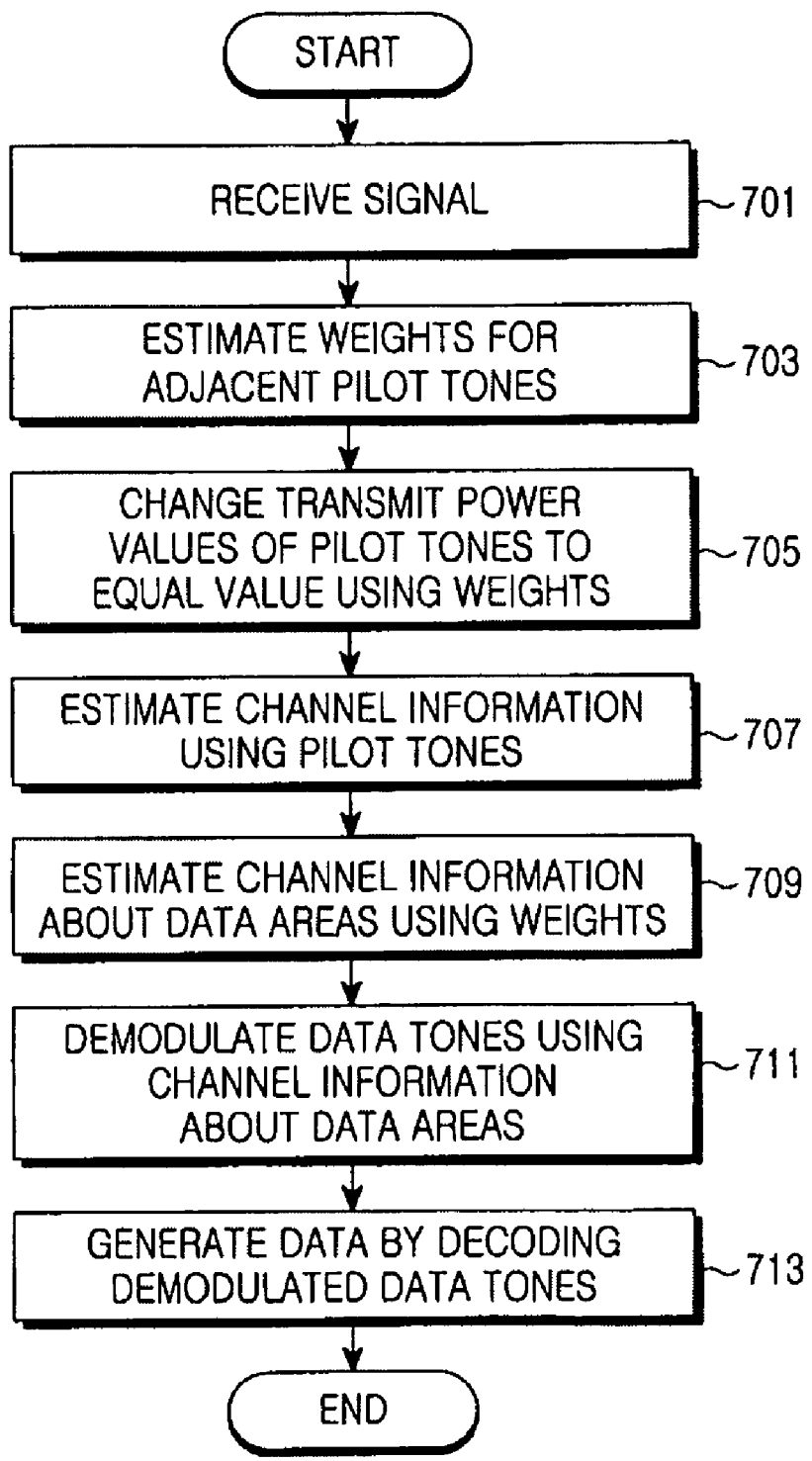
FIG. 7 is a flowchart illustrating a signal reception operation of the receiver according to the first exemplary embodiment of the present invention.

FIG. 7 is a flowchart illustrating a signal reception operation of the receiver according to the first exemplary embodiment of the present invention.

Referring to FIG. 7, the receiver receives a signal from the transmitter in step 701 and estimates the weight of each data area by calculating a transmit power ratio between adjacent pilot tones in the data area in step 703. For example, if $\alpha P$ and P are applied as the transmit power values of adjacent pilot tones in the first data area 233, the receiver estimates the weight $\alpha$ by dividing $\alpha P$ by P. In this manner, the receiver estimates the weights of the data areas, $\alpha$, $\beta$ and $\gamma$.

In step 705, the receiver changes the transmit power values of all pilot tones to the substantially same value using the weights $\alpha$, $\beta$ and $\gamma$. For example, the receiver detects pilot tones with the transmit power value $\alpha P$ from among the pilot tones of the first data area 233 and changes the transmit power value $\alpha P$ of the pilot tones to P by dividing $\alpha P$ by $\alpha$. In a substantially similar manner, the receiver changes the transmit power values of all pilot tones to P.

The receiver performs channel estimation using the pilot tones with the substantially same transmit power value in step 707 and estimates channel information about the respective data areas using the estimated weights in step 709. For example, the receiver estimates the channel information about the first data area 233 by multiplying the estimated channel information by $\alpha$. In this manner, the receiver estimates the channel information about the respective data areas.

In step 711, the receiver demodulates the data tones of the data areas based on the channel information about the data areas. The receiver then generates data by decoding the demodulated data tones in step 713.

By using the above operation, the receiver can estimate channel information about data areas using a transmit power ratio between adjacent pilot tones in each data area, in spite of there being different transmit powers of the data areas (i.e. a power unbalance).

Figure 8:
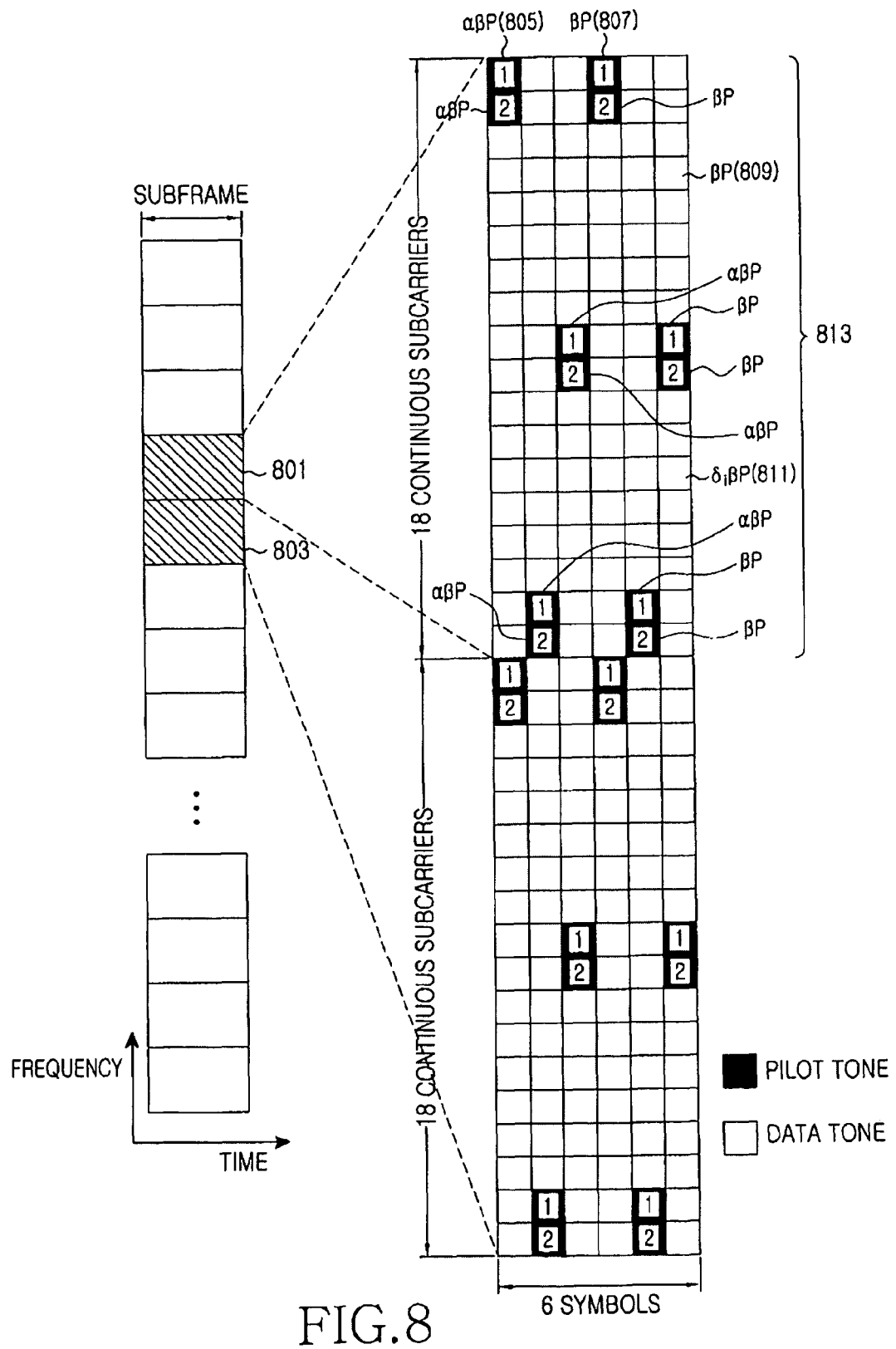
FIG. 8 illustrates a structure of a DL subframe according to a third exemplary embodiment of the present invention.

FIG. 8 illustrates a structure of a DL subframe according to a third exemplary embodiment of the present invention. With reference to FIG. 8, the DL subframe structure will be described below.

Referring to FIG. 8, a plurality of DL subframes 801 and 803 are adjacent in frequency. One DL subframe 801 includes six symbols along the time axis and 18 successive subcarriers along the frequency axis. Compared to the DL subframe 247 illustrated in FIG. 2, the DL subframe 801 is not divided into MAP areas and data areas and the DL subframe 801 has one data area 813 defined by the six symbols and the 18 subcarriers. The data area 813 carries MAP messages, data bursts, and pilot signals altogether. Different transmit power values $\delta_i \beta \cdot P$ (811) are applied to the MAP messages according to users to receive the MAP messages and the substantially same reference transmit power value $\beta P$ (809) is applied to the data bursts. $\delta_i$ represents a weight for each user, applied to a MAP message and $\beta$ is a variable that renders the transmit power values of the entire OFDMA symbols substantially equal.

$\beta$ may vary in each subframe and thus data bursts may be transmitted with different transmit power values in a current subframe and the next subframe. The power unbalance between data bursts of different subframes makes it difficult to accurately estimate the transmit power values of pilot tones. As a consequence, errors may occur during channel estimation.

To perform channel estimation accurately in spite of there being a power unbalance between data bursts of different subframes, an exemplary embodiment of the present invention proposes a method for allocating different transmit power values to temporally neighboring pilot tones in the data area 813, prior to transmission. That is, one of pilot tones neighboring to each other in time is transmitted with the reference transmit power value and the other pilot tone is transmitted with a transmit power value being the product between a weight and the reference transmit power value. The weight is larger than zero (0) and is determined by taking into account the transmit power values of the MAP messages, the transmit power value of the data bursts, and the total transmit power value of the DL subframe.

For example, if the data tones are transmitted with the reference transmit power value $\beta P$ or the product between the reference transmit power value and a transmit power weight for a user, $\delta_i \beta \cdot P$, the transmitter transmits one of temporally neighboring pilot tones with the product between the reference transmit power value and a weight, $\alpha \beta P$ and the other pilot tone with the reference transmit power value $\beta P$.

That is, the transmitter transmits one 805 of temporally neighboring pilot tones 805 and 807 with the product between the reference transmit power value and a weight and the other pilot tone 807 with the reference transmit power value.

The receiver estimates a transmit power ratio between the temporally neighboring pilot tones 805 and 807, changes the transmit power values of all pilot tones to the substantially same value using the estimated transmit power ratio, estimates channel information using the pilot tones changed to the substantially same transmit value, and decodes data using the estimated channel estimation.

For example, if transmit power values $\alpha \beta P$ and $\beta P$ are applied to the neighboring pilot tones 805 and 807, respectively, the receiver estimates the weight $\alpha$ by calculating the transmit power ratio between the pilot tones 805 and 807 and changes the transmit power values of all pilot tones to $\beta P$ using the weight $\alpha$. For the power change, the receiver divides the transmit power values $\alpha \beta P$ by $\alpha$. The receiver estimates channel information using all pilot tones with the transmit power value $\beta P$ and decodes data bursts using the estimated channel information.

A transmitter according to the third exemplary embodiment of the present invention has a substantially similar configuration as that illustrated in FIG. 4. Therefore, an operation of the transmitter according to the third exemplary embodiment of the present invention will be described with reference to FIG. 4.

Referring back to FIG. 4, the transmitter includes the first and second encoders 401 and 403, the first and second modulators 405 and 407, the pilot tone generator 409, the power decider 411, the mapper 413, the IFFT processor 415, the PSC 417, and the RF module (not shown). Since the first and second encoders 401 and 403, the first and second modulators 405 and 407, the pilot tone generator 409, the IFFT processor 415, the PSC 417, and the RF module (not shown) operate in a substantially similar manner as the transmitter according to the first exemplary embodiment of the present invention, their operations will not be described herein. However, the power decider 411 and the mapper 413 operate differently from those of the transmitter according to the first exemplary embodiment of the present invention and thus their operations will be described below.

The power decider 411 determines transmit power values for MAP messages for individual users, taking into account CQI about a total frequency band and determines a transmit power value for one of temporally neighboring pilot tones according to the transmit power values of the MAP messages. For determining the transmit power value of the one pilot tone, the power decider 411 computes Equation (2) and the transmit power value of the one pilot tone depends on the relationship between the transmit power values of the MAP messages and the total transmit power value of a DL subframe.

$$\alpha \beta P = \frac{\left(N - \beta \cdot N_p/2 - \beta N_d - \sum_i^u \beta \delta_i \cdot N_i\right)}{N_p/2} P \qquad (2)$$

In Equation (2), $N_d = N - N_p - \Sigma_i^u N_i$, $\alpha$ denotes the weight, $\beta P$ denotes the reference transmit power value, N denotes the total number of subcarriers in the DL subframe, $\beta$ denotes a variable that renders the transmit power values of the entire OFDMA symbols substantially equal, $N_p$ denotes the number of pilot subcarriers transmitted at a predefined time, $N_i$ denotes the number of subcarriers per OFDMA symbol, allocated to a MAP message for an $i^{th}$ user, $N_d$ denotes the number of data subcarriers carrying data bursts transmitted at a predefined time, $\delta_i$ denotes a transmit power weight applied to the MAP message for the $i^{th}$ user, and u denotes the number of users to receive the MAP messages.

The power decider 411 determines the transmit power values of the temporally neighboring pilot tones according to the determined transmit power value. To be more specific, the power decider 411 determines the transmit power value of one 805 of the neighboring pilot tones 805 and 807 to be the product between the reference transmit power value and the weight and the transmit power value of the other pilot tone 807 to be the reference transmit power value.

The power decider 411 outputs the transmit power values of the MAP messages, the reference transmit power value for the data bursts, and the transmit power values of the pilot tones to the mapper 413.

The mapper 413 allocates transmit power to the data tones carrying the MAP messages or the data bursts and the pilot tones according to the received transmit power values, maps the data tones and the pilot tones, and outputs the mapped signal to the IFFT processor 415.

A receiver according to the third exemplary embodiment of the present invention has a substantially similar configuration to that illustrated in FIG. 5. Therefore, an operation of the receiver according to the third exemplary embodiment of the present invention will be described with reference to FIG. 5.

Referring back to FIG. 5, the receiver includes the SPC 501, the FFT processor 503, the demapper 505, the power weight calculator 507, the channel estimator 509, the demodulator 511, the decoder 513, and the RF module (not shown). Since the SPC 501, the FFT processor 503, the demapper 505, the demodulator 511, the decoder 513, and the RF module (not shown) operate in a substantially similar manner as the receiver according to the first exemplary embodiment of the present invention, their operations will not be described herein. However, the power weight calculator 507 and the channel estimator 509 operate differently from those of the receiver according to the first exemplary embodiment of the present invention and thus their operations will be described below.

The power weight calculator 507 estimates a weight being a transmit power ratio by comparing the transmit power values of temporally neighboring pilot tones. For example, if the transmit power values of the neighboring pilot tones are $\alpha\beta P$ and $\beta P$, the power weight calculator 507 estimates the weight $\alpha$ by calculating the ratio between the transmit power values.

The channel estimator 509 changes the transmit power values of all pilot tones to the substantially same value using the weight. For instance, the channel estimator 509 detects pilot tones with the transmit power value of $\alpha\beta P$ and changes the transmit power value $\alpha\beta P$ of the detected pilot tones to $\beta P$ by dividing $\alpha\beta P$ by $\alpha$. The channel estimator 509 estimates channel information using the pilot tones changed to the substantially same transmit power value and transmits the estimated channel information to the demodulator 511.

Figure 9:
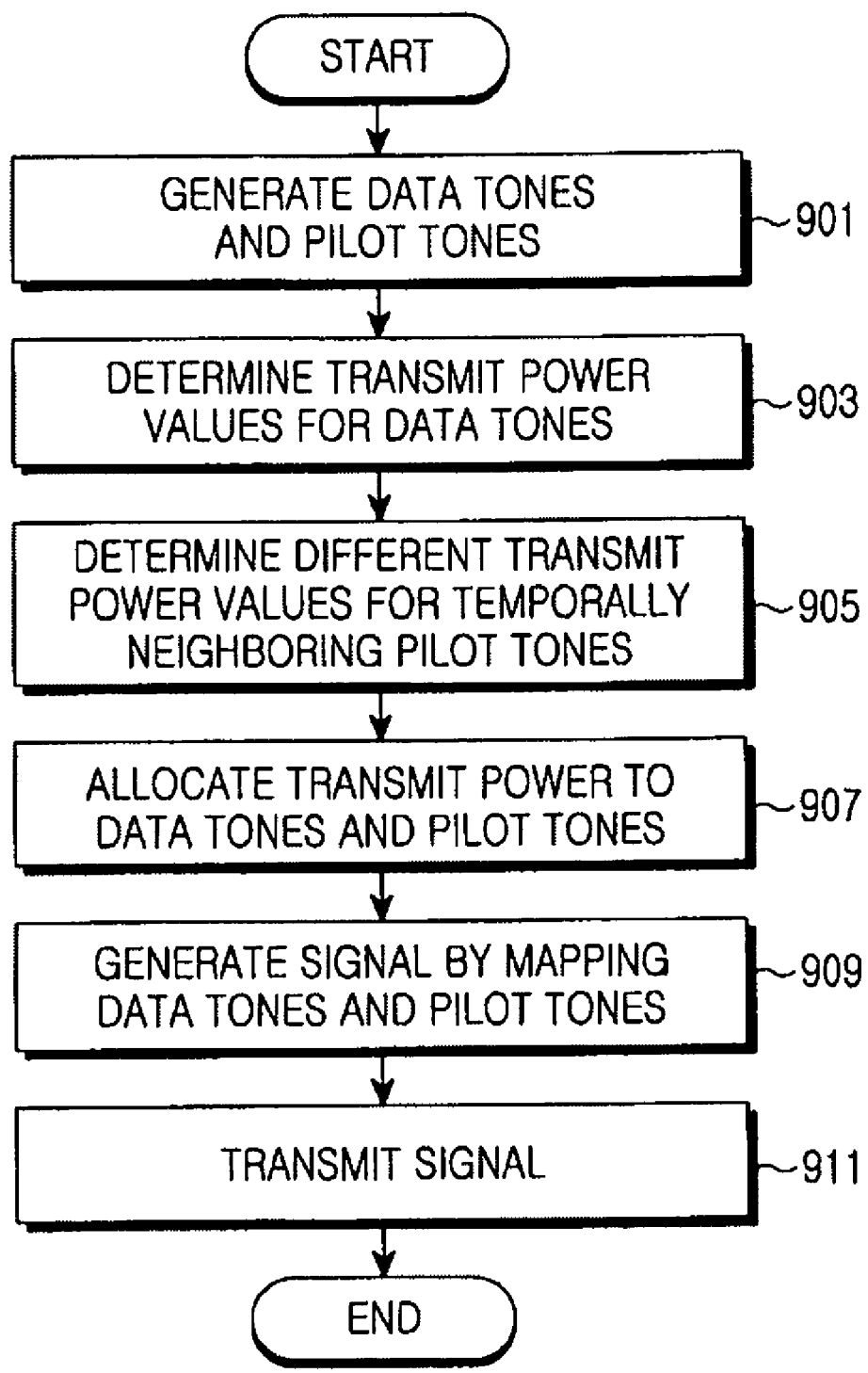
FIG. 9 is a flowchart illustrating a signal transmission operation of the transmitter according to the third exemplary embodiment of the present invention.

FIG. 9 is a flowchart illustrating a signal transmission operation of the transmitter according to the third exemplary embodiment of the present invention.

Referring to FIG. 9, the transmitter generates MAP messages for respective users, data bursts, and pilot signals on a subframe basis in step 901 and determines transmit power values for the MAP messages and a reference transmit power value for the data bursts using CQI in step 903.

In step 905, the transmitter determines a weight $\alpha$ being a transmit power ratio between temporally neighboring pilot tones in the substantially same frequency, taking into account the reference transmit power value of the data bursts. For the weight determination, the transmitter computes Equation (2) using the transmit power values of the MAP messages and the reference transmit power value of the data bursts. The transmitter sets the transmit power value of one of the neighboring pilot tones to the reference transmit power value and the transmit power value of the other pilot tone to the product between the reference transmit power value and the weight.

In step 907, the transmitter allocates transmit power to data tones including the MAP messages and the data bursts, and the pilot tones according to the transmit power values determined in steps 903 and 905.

The transmitter maps the data tones and the pilot tones in step 909 and transmits the mapped signal through the antenna after IFFT in step 911.

By using the above operation, the transmitter determines different transmit power values for temporally neighboring pilot tones in the substantially same frequency according to the transmit power values of data bursts and the transmit power values of MAP messages. Herein, the transmit power value of one of the neighboring pilot tones is the reference transmit power value and that of the other pilot tone is the product between the reference transmit power value and a weight. The weight is determined according to the transmit power value of the data bursts and the transmit power values of the MAP messages.

Figure 10:
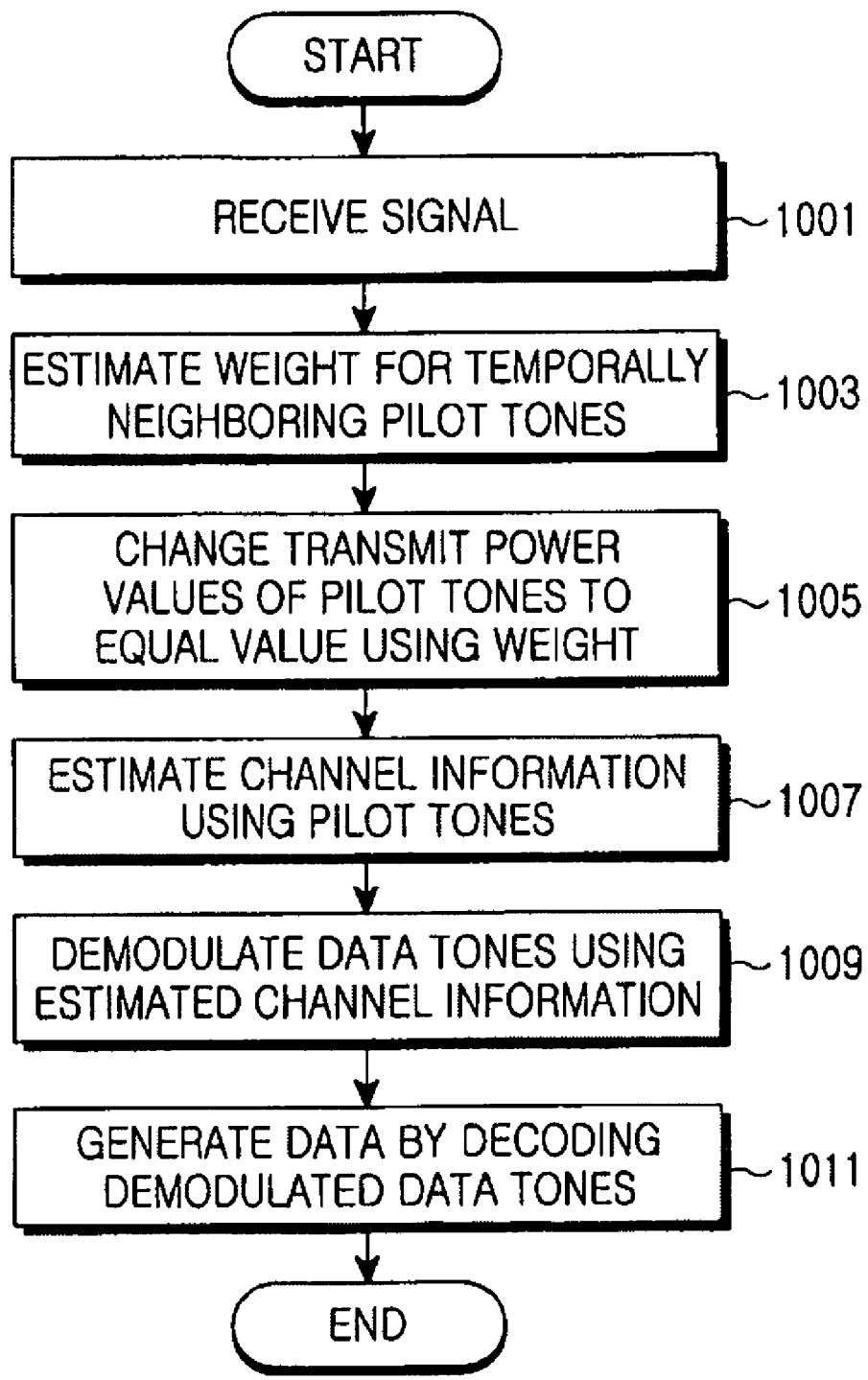
FIG. 10 is a flowchart illustrating a signal reception operation of the receiver according to the third exemplary embodiment of the present invention.

FIG. 10 is a flowchart illustrating a signal reception operation of the receiver according to the third exemplary embodiment of the present invention.

Referring to FIG. 10, the receiver receives a signal from the transmitter in step 1001 and estimates a weight by calculating a transmit power ratio between temporally neighboring pilot tones in step 1003. For example, if $\alpha\beta P$ and $\beta P$ are applied as the transmit power values of the neighboring pilot tones, the receiver estimates the weight $\alpha$ by dividing $\alpha\beta P$ by $\beta P$.

In step 1005, the receiver changes the transmit power values of all pilot tones to the substantially same value using the estimated weight $\alpha$. For example, the receiver detects pilot tones with the transmit power value $\alpha\beta P$ from among all pilot tones and changes the transmit power value $\alpha\beta P$ of the detected pilot tones to P by dividing $\alpha\beta P$ by $\alpha$.

The receiver estimates channel information using the pilot tones changed to the substantially same transmit power value in step 1007, demodulates data tones based on the estimated channel information in step 1009, and generates data by decoding the demodulated data tones in step 1011.

By using the above operation, the receiver can estimate channel information accurately using a transmit power ratio between temporally neighboring pilot tones in the substantially same frequency, in spite of different transmit powers between data bursts of different subframes (i.e. a power unbalance between subframes).

As is apparent from the above description, the exemplary embodiments of the present invention can perform channel estimation accurately using pilot tones transmitted at different transmit power levels, despite there being a power unbalance between the data bursts of data areas or the data bursts of subframes.

While the invention has been shown and described with reference to certain exemplary embodiments of the present invention thereof, they are mere exemplary applications. For example, while a transmitter transmits MAP messages in an FDM/separate coding scheme, the MAP transmission can be carried out in a TDM/separate coding scheme. While exemplary embodiments of the present invention have been described in the context of DL subframes, the present invention is applicable to other DL frame structures. In addition, while exemplary embodiments of the present invention have been described in the context of pilot tones, the present invention is applicable to other reference signals.

Therefore, it will be understood by those skilled in the art that various changes in form and details may be made therein without departing from the spirit and scope of the present invention as defined by the appended claims and their equivalents.

What is claimed is:

1. A method for transmitting a reference signal in a transmitter in a communication system, the method comprising:

determining first and second transmit power values for first and second pilot tones, the first and second transmit power values being different; and transmitting the first pilot tone with the first transmit power value and the second pilot tone with the second transmit power value, wherein the first transmit power value comprises a reference transmit power value and the second transmit power comprises a product between a weight and the reference transmit power value, and wherein the first and the second pilot tones reside in one of a substantially same time resource and a substantially same frequency resource among pilot tones included in a data area in a subframe having time and frequency resources.

2. The method of claim 1, wherein the weight is larger than zero (0) and is determined by taking into account transmit power value of MAP messages, transmit power value of data bursts, and a total transmit power value of the subframe.

3. The method of claim 1, wherein if the first and second pilot tones are in the substantially same frequency resource and the data area includes a first data tone carrying a MAP message and a second data tone carrying a data burst, the transmit power value determination comprises determining the second transmit power value according to transmit power values of the first and second data tones and a total transmit power value.

4. The method of claim 3, wherein the transmit power value determination comprises determining the second transmit power value by the following equation, $$\alpha\beta P = \frac{\left(N - \beta \cdot N_p/2 - \beta N_d - \sum_i^u \beta \delta_i \cdot N_i\right)}{N_p/2} P$$

where $N_d = N - N_p - \sum_i^u N_i$, $\alpha$ denotes the weight, $\beta P$ denotes the reference transmit power value, N denotes a total number of subcarriers, $\beta$ denotes a variable that renders transmit power values of entire Orthogonal Frequency Division Multiple Access (OFDMA) symbols substantially equal, $N_p$ denotes the number of pilot subcarriers transmitted at a predefined time, $N_i$ denotes the number of subcarriers per OFDMA symbol, allocated to a MAP message for an $i^{th}$ user, $N_d$ denotes the number of data subcarriers carrying data bursts transmitted at a predefined time, $\delta_i$ denotes a transmit power weight applied to the MAP message for the $i^{th}$ user, and u denotes the number of users to receive MAP messages.

5. The method of claim 3, wherein the transmit power value determination comprises determining the transmit power values of the first and second data tones using Channel Quality Information (CQI).

6. A method for receiving a reference signal in a receiver in a communication system, the method comprising:
receiving first and second pilot tones;
estimating a weight being a ratio between a first transmit power value of the first pilot tone and a second transmit power value of the second pilot tone, the first and second transmit power values being different;
changing transmit power values of the pilot tones to a substantially equal transmit power value using the weight; and
performing channel estimation using the pilot tones with the substantially equal transmit power value,
wherein the first transmit power value comprises a reference transmit power value and the second transmit power value comprises a product between the weight and the reference transmit power value, and
wherein the first and the second pilot tones reside in one of a substantially same time resource and a substantially same frequency resource among pilot tones included in a data area in a subframe having time and frequency resources.

7. The method of claim 6, wherein if the first and second pilot tones are in the same frequency resource and the data area includes a first data tone carrying a MAP message and a second data tone carrying a data burst, the second transmit power value is determined according to transmit power values of the first and second data tones and a total transmit power value.

8. The method of claim 7, wherein the second transmit power value is determined by the following equation, $$\alpha\beta P = \frac{\left(N - \beta \cdot N_p/2 - \beta N_d - \sum_i^u \beta \delta_i \cdot N_i\right)}{N_p/2} P$$

where $N_d = N - N_p - \sum_i^u N_i$, $\alpha$ denotes the weight, $\beta P$ denotes the reference transmit power value, N denotes a total number of subcarriers, $\beta$ denotes a variable that renders transmit power values of entire Orthogonal Frequency Division Multiple Access (OFDMA) symbols substantially equal, $N_p$ denotes the number of pilot subcarriers transmitted at a predefined time, $N_i$ denotes the number of subcarriers per OFDMA symbol, allocated to a MAP message for an $i^{th}$ user, $N_d$ denotes the number of data subcarriers carrying data bursts transmitted at a predefined time, $\delta_i$ denotes a transmit power weight applied to the MAP message for the $i^{th}$ user, and u denotes the number of users to receive MAP messages.

9. The method of claim 6, further comprising demodulating data tones included in the subframe according to the channel estimation.

10. An apparatus for transmitting a reference signal in a transmitter in a communication system, the apparatus comprising:
a power decider for determining first and second transmit power values for first and second pilot tones, the first and second transmit power values being different; and
a Radio Frequency (RF) module for transmitting the first pilot tone with the first transmit power value and the second pilot tone with the second transmit power value,
wherein the first transmit power value comprises a reference transmit power value and the second transmit power value comprises a product between a weight and the reference transmit power value, and
wherein the first and the second pilot tones reside in one of a substantially same time resource and a substantially same frequency resource among pilot tones included in a data area in a subframe having time and frequency resources.

11. The apparatus of claim 10, wherein the weight is larger than zero (0) and is determined by taking into account transmit power value of MAP messages, transmit power value of data bursts, and a total transmit power value of the subframe.

12. The apparatus of claim 10, wherein if the first and second pilot tones are in the substantially same frequency resource and the data area includes a first data tone carrying a MAP message and a second data tone carrying a data burst, the power decider determines the second transmit power value according to transmit power values of the first and second data tones and a total transmit power value.

13. The apparatus of claim 12, wherein the power decider determines the second transmit power value by the following equation, $$\alpha\beta P = \frac{\left(N - \beta \cdot N_p/2 - \beta N_d - \sum_i^u \beta \delta_i \cdot N_i\right)}{N_p/2} P$$

where $N_d = N - N_p - \sum_i^u N_i$, $\alpha$ denotes the weight, $\beta P$ denotes the reference transmit power value, N denotes a total number of subcarriers, $\beta$ denotes a variable that renders transmit power values of entire Orthogonal Frequency Division Multiple Access (OFDMA) symbols substantially equal, $N_p$ denotes the number of pilot subcarriers transmitted at a predefined time, $N_i$ denotes the number of subcarriers per OFDMA symbol, allocated to a MAP message for an $i^{th}$ user, $N_d$ denotes the number of data subcarriers carrying data bursts transmitted at a predefined time, $\delta_i$ denotes a transmit power weight applied to the MAP message for the $i^{th}$ user, and u denotes the number of users to receive MAP messages.

14. The apparatus of claim 12, wherein the power decider determines the transmit power values of the first and second data tones using Channel Quality Information (CQI).

15. An apparatus for receiving a reference signal in a receiver in a communication system, the apparatus comprising:
- a Radio Frequency (RF) module for receiving first and second pilot tones;
- a power weight calculator for estimating a weight being a ratio between a first transmit power value of the first pilot tone and a second transmit power value of the second pilot tone, the first and second transmit power values being different; and
- a channel estimator for changing transmit power values of the pilot tones to a substantially equal transmit power value using the weight and performing channel estimation using the pilot tones with the substantially equal transmit power value,
- wherein the first transmit power value comprises a reference transmit power value and the second transmit power value comprises a product between the weight and the reference transmit power value, and
- wherein the first and the second pilot tones reside in one of a substantially same time resource and a substantially same frequency resource among pilot tones included in a data area in a subframe having time and frequency resources.

16. The apparatus of claim 15, wherein if the first and second pilot tones are in the substantially same frequency resource and the data area includes a first data tone carrying a MAP message and a second data tone carrying a data burst, the second transmit power value is determined according to transmit power values of the first and second data tones and a total transmit power value.

17. The apparatus of claim 16, wherein the second transmit power value is determined by the following equation, $$\alpha \beta P = \frac{\left(N - \beta \cdot N_p/2 - \beta N_d - \sum_{i}^{u} \beta \delta_i \cdot N_i\right)}{N_p/2} P$$

where $N_d = N - N_p - \Sigma_i^u N_i$, $\alpha$ denotes the weight, $\beta P$ denotes the reference transmit power value, N denotes a total number of subcarriers, $\beta$ denotes a variable that renders transmit power values of entire Orthogonal Frequency Division Multiple Access (OFDMA) symbols substantially equal, $N_p$ denotes the number of pilot subcarriers transmitted at a predefined time, $N_i$ denotes the number of subcarriers per OFDMA symbol, allocated to a MAP message for an $i^{th}$ user, $N_d$ denotes the number of data subcarriers carrying data bursts transmitted at a predefined time, $\delta_i$ denotes a transmit power weight applied to the MAP message for the $i^{th}$ user, and u denotes the number of users to receive MAP messages.

18. The apparatus of claim 15, further comprising a demodulator for demodulating data tones included in the subframe according to the channel estimation.

* * * * *